John Francis Chase. Imp't in Harrows.
Fig. 3. REISSUED JUL 11 1871
4464
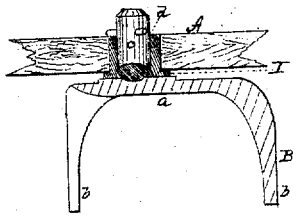
Fig. 2.
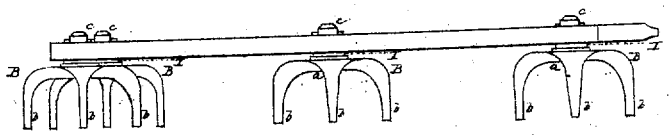
Fig. 1.
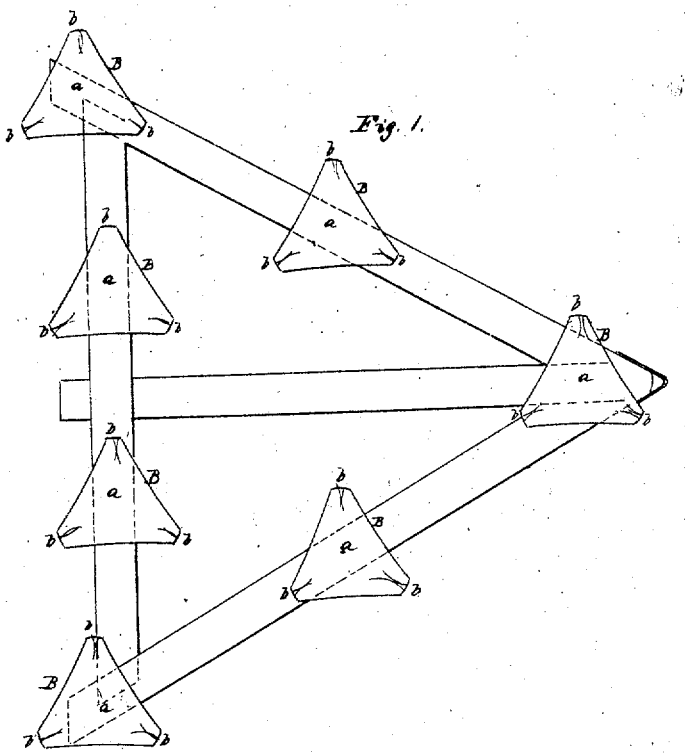
Witnesses.
George A. Bird
George F. Clifford
Inventor.
John Francis Chase
per W. H. Clifford atty.

UNITED STATES PATENT OFFICE.

JOHN F. CHASE, OF WESTBROOK, MAINE.

IMPROVEMENT IN ROTARY HARROW-TEETH.

Specification forming part of Letters Patent No. 113,141, dated March 28, 1871; reissue No. 4,464, dated July 11, 1871.

*To all whom it may concern:*

Be it known that I, JOHN F. CHASE, of Westbrook, in the county of Cumberland and State of Maine, have invented a new and useful Improvement in Rotary Harrows; and I hereby declare the following to be a full, clear, and exact description of the same, reference being had to the accompanying drawing forming part of this specification, in which—

Figure 1 denotes an under-side view; Fig. 2, a side elevation of a harrow provided with three-pronged rotary teeth, in accordance with my invention.

Same letters show like parts.

The main body or frame of the harrow, as herein represented, is a triangular frame; but this particular form is not necessary to the operation of the part to which my invention relates. A shows the frame. Each tooth B is pivoted to the frame, and the several teeth are arranged relatively to the frame in the manner represented in each tooth. Each of said teeth is composed of a base, *a*, and three prongs, *b b b*, made or cast in one piece of metal. At the center of its upper side each plate or base *a* is furnished with a pivot, *c*, to enter the frame A; upon this the plate revolves as the harrow is drawn over the field. The pivot *c* may enter and revolve in, if desired, a bearing or box, *d*, fitted into the frame A. Each prong is triangular in its horizontal section, and, being connected with the base or plate *a*, descends vertically from the same. Fig. 3 shows a cross-section of a tooth, B, its journal, and the bearing-box before referred to, and the part of the frame into which the pivot is fixed. The pivot can be secured in a variety of well-known ways, or by a pin, as shown in Fig. 3, the same passing through the upper end of said pivot. The edges of the base *a* may be made sharp between the prongs, so as to render the tooth less likely to become, in use, clogged by roots or stones. The triangular form of the prongs enables them to slip readily by opposing stones or roots while the harrow is in operation. This harrow operates differently from common rotary harrows with a number of teeth set into a rotary frame pivoted to a main frame of a harrow. This results from the triangular shape of the base *a* and the teeth at each angle of the same.

I do not claim a rotary harrow as constructed with teeth set in one or more rotary frames applied to a body or frame.

What I do claim, and desire to secure by Letters Patent, is—

As a new manufacture, a rotary tooth for a harrow, said tooth being composed of the prongs *b*, and the base *a*, arranged and formed in one piece of metal provided with a central pivot or bearing.

Portland, April 24, 1871.

JOHN F. CHASE.

Witnesses:

WM. HENRY CLIFFORD,
GEORGE E. BIRD.